United States Patent
Takagi et al.

(10) Patent No.: US 11,168,194 B2
(45) Date of Patent: Nov. 9, 2021

(54) OLEFINIC THERMOPLASTIC ELASTOMER FOAMED PARTICLES

(71) Applicant: JSP Corporation, Tokyo (JP)

(72) Inventors: Shota Takagi, Yokkaichi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 125 days.

(21) Appl. No.: 16/625,176

(22) PCT Filed: Jun. 21, 2018

(86) PCT No.: PCT/JP2018/023693
§ 371 (c)(1),
(2) Date: Dec. 20, 2019

(87) PCT Pub. No.: WO2019/009094
PCT Pub. Date: Jan. 10, 2019

(65) Prior Publication Data
US 2020/0140643 A1 May 7, 2020

(30) Foreign Application Priority Data
Jul. 3, 2017 (JP) .............................. JP2017-130533

(51) Int. Cl.
*C08J 9/16* (2006.01)

(52) U.S. Cl.
CPC ............ *C08J 9/16* (2013.01); *C08J 2201/032* (2013.01); *C08J 2201/034* (2013.01); *C08J 2203/06* (2013.01); *C08J 2323/06* (2013.01)

(58) Field of Classification Search
CPC .. C08J 9/16; C08J 2201/032; C08J 2201/034; C08J 2203/06; C08J 2323/06;
(Continued)

(56) References Cited

U.S. PATENT DOCUMENTS

2017/0283575 A1 10/2017 Akuta et al.
2018/0345575 A1* 12/2018 Constantinou ........ B29C 64/165

FOREIGN PATENT DOCUMENTS

EP 3626768 A1 3/2020
JP 2016-216527 A 12/2016
(Continued)

OTHER PUBLICATIONS

Extended European Search Report issued in corresponding EP Application No. 18827355.1 dated Mar. 3, 2021 (7 pages).
(Continued)

*Primary Examiner* — Kara B Boyle
(74) *Attorney, Agent, or Firm* — Fitch, Even, Tabin & Flannery LLP

(57) ABSTRACT

The present invention relates to thermoplastic olefin elastomer expanded beads, having an average aspect ratio of 1.10 or less and an average circularity of 0.985 or more. The thermoplastic olefin elastomer expanded beads preferably have a crystal structure such that a melting peak inherent in the thermoplastic olefin elastomer (inherent peak) and one or more melting peaks on a higher temperature side than the inherent peak (high temperature peaks) appear on a DSC curve obtained when heating the expanded beads from 23° C. to 200° C. at a heating rate of 10° C./min.

6 Claims, 1 Drawing Sheet

(58) Field of Classification Search
CPC . C08J 9/122; C08J 9/18; C08J 2201/03; C08J 2353/00; C08J 2300/22; C08J 2205/044; C08J 2300/26; C08J 2201/026
See application file for complete search history.

(56) References Cited

FOREIGN PATENT DOCUMENTS

| JP | 2016216527 A | * | 12/2016 | ............. C08J 9/232 |
|----|--------------|---|---------|--------------------------|
| JP | 2017-066361 A |   | 4/2017  |                          |
| JP | 2017066361 A | * | 4/2017  |                          |
| JP | 2017-171846 A |   | 9/2017  |                          |
| JP | 2017-177550 A |   | 10/2017 |                          |
| WO | 2016/052112 A1 |  | 4/2016  |                          |

OTHER PUBLICATIONS

International Search Report for JP2018/023693, dated Sep. 25, 2018, and English Translation submitted herewith (5 pages).

* cited by examiner

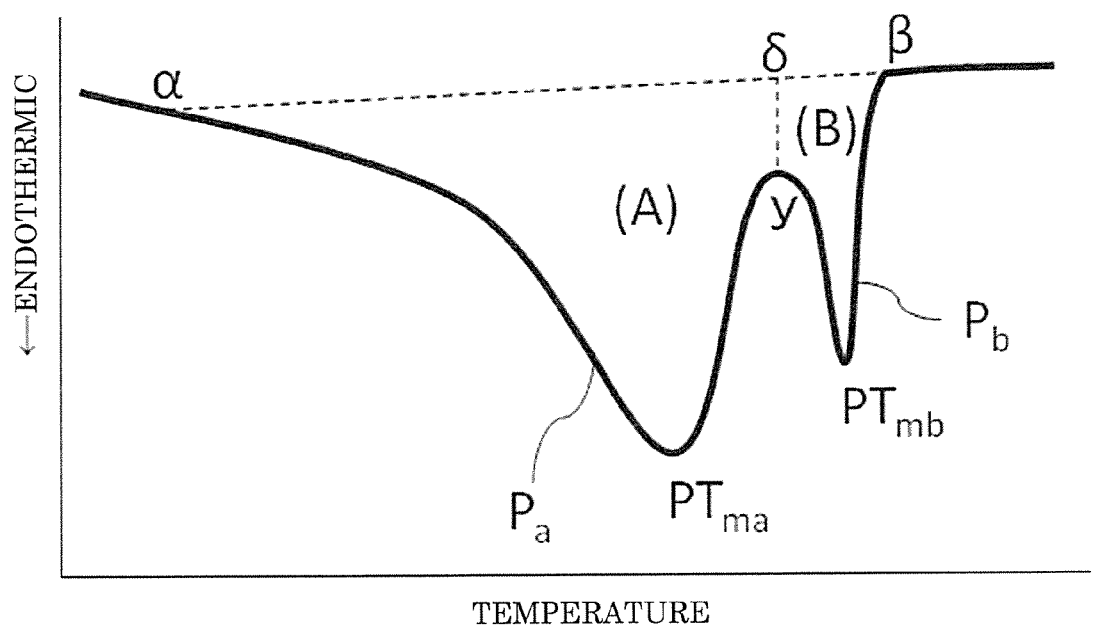

OLEFINIC THERMOPLASTIC ELASTOMER FOAMED PARTICLES

CROSS-REFERENCE TO RELATED APPLICATIONS

This application is a U.S. national phase application filed under 35 U.S.C. § 371 of International Application Number PCT/JP2018/023693, filed Jun. 21, 2018, designating the United States, which claims priority from Japanese Application Number 2017-130533, filed Jul. 3, 2017.

FIELD OF THE INVENTION

The present invention relates to thermoplastic olefin elastomer expanded beads.

BACKGROUND OF THE INVENTION

Crosslinked expanded beads obtained by crosslinking and expanding particles of a multi-block copolymer including a polyethylene block and an ethylene/α-olefin copolymer block, for example, is disclosed as thermoplastic olefin elastomer expanded beads that can provide a molded article of the expanded beads that is excellent in in-mold moldability and is excellent in the lightweight property, flexibility, rebound resilience, recoverability, and tensile characteristics with good balance (PTL 1).

CITATION LIST

Patent Literatures

PTL 1: JP-A-2016-216527

SUMMARY OF INVENTION

However, when conventional thermoplastic olefin elastomer expanded beads are formed into an in-mold molded article through in-mold molding, there may be a variation in the parts of the article in the physical properties such as flexibility, rebound resilience, and compressive stress. Also when such expanded beads are packed into a bag, a hollow part of a soft hollow molded article, or the like and used without undergoing fusion bonding in an application to a cushion, the resulting products may vary in the physical properties such as rebound resilience.

Under these circumstances, an object of the present invention is to provide thermoplastic olefin elastomer expanded beads that can produce products, such as an in-mold molded article and a cushion, that have little variation in the compressive property.

As a result of earnest studies, the present inventors have found that when the configuration described below is adopted, the above problems can be solved, and thus completed the present invention.

Specifically, the present invention is as follows.
[1] Thermoplastic olefin elastomer expanded beads, having an average aspect ratio of 1.10 or less and an average circularity of 0.985 or more.
[2] The thermoplastic olefin elastomer expanded beads according to [1], containing 1 to 60% by weight of a fraction insoluble in hot xylene.
[3] The thermoplastic olefin elastomer expanded beads according to [1] or [2], having an apparent density of 30 to 300 kg/m$^3$ and a 50% volume average bead diameter of 1 to 10 mm.
[4] The thermoplastic olefin elastomer expanded beads according to any one of [1] to [3], having an average of a cell diameter of 20 to 100 μm and a coefficient of variation of the cell diameter of 30% or less.
[5] The thermoplastic olefin elastomer expanded beads according to any one of [1] to [4], having a crystal structure such that a melting peak inherent in the thermoplastic olefin elastomer (inherent peak) and one or more melting peaks on a higher temperature side than the inherent peak (high temperature peaks) appear on a DSC curve obtained when heating the expanded beads from 23° C. to 200° C. at a heating rate of 10° C./min.
[6] The thermoplastic olefin elastomer expanded beads according to [5], wherein in the DSC curve, a total heat of melting is 20 to 60 J/g, and a ratio of a heat of melting of the high temperature peaks to the total heat of melting is 0.1 to 0.5.

According to the present invention, thermoplastic olefin elastomer expanded beads that can produce products, such as an in-mold molded article and a cushion, that have little variation in the compressive property can be provided.

BRIEF DESCRIPTION OF DRAWING

FIG. 1 is a DSC curve on the first heating of thermoplastic olefin elastomer expanded beads according to an embodiment of the present invention.

DESCRIPTION OF EMBODIMENTS

<Thermoplastic Olefin Elastomer Expanded Beads>

The thermoplastic olefin elastomer expanded beads of the present invention are expanded beads having an average aspect ratio of 1.10 or less and an average circularity of 0.985 or more.

Hereinafter, a "thermoplastic olefin elastomer" is sometimes referred to as a "TPO". "Thermoplastic olefin elastomer expanded beads" is sometimes referred simply to as "expanded beads" or "TPO expanded beads".

The aspect ratio herein is calculated as a ratio of the maximum length of a bead, L, to the maximum diameter in the cross section of the bead orthogonal to the lengthwise direction of the maximum length L of the bead, D, i.e., L/D.

The circularity can be determined in the following manner. A group of beads are freely fallen at an appropriate frequency, and a projection image in the horizontal direction of the group of beads that are falling is taken with a CCD camera or the like to obtain a bead image. The bead image was subjected to an image processing such as binarization and connected-component processing to obtain a FIGURE of the bead, and circle equivalent arithmetic processing and arithmetic processing for miner radius/major radius of an ellipse is carried out on the FIGURE of the bead to obtain the circularity. The circularity is determined as the ratio, the circle equivalent circumference/the found circumference, in the circle equivalent arithmetic processing and the circle equivalent circumference is determined as the circumference of a circle that has the same area as the FIGURE. The found circumference means the circumference actually measured.

As the aspect ratio and the circularity are each closer to 1, the bead is in a form closer to a true sphere. The lower limit of the aspect ratio is 1, and the upper limit of the circularity is 1.

As an analyzer Militrac JPA (product name) manufactured by Nikkiso Co., Ltd. can be used.

TPOs have the sparsely-slipping property compared to general purpose resins such as polypropylene resins. Therefore, when packing TPO expanded beads into a mold, a bag, or the like, it is difficult to fill them evenly and uniformly, and it is considered that as a result, the filled state is likely to vary. Since the expanded beads of the present invention have an average aspect ratio of 1.10 or less and an average circularity of 0.985 or more, which are in the form of a true sphere or a sphere shape close to a true sphere, the expanded beads are excellent in the filling characteristics into a mold when molding, and molded articles obtained through in-mold molding have small variation in the physical properties such as the compressive property and the rebound resilience. When the expanded beads not undergoing in-mold molding are packed into a confining member such as a bag and used as such, the expanded beads are packed evenly into the confining member, and therefore, variation in the physical properties typified by the compressive property and the rebound resilience in the resulting products are prevented.

The average aspect ratio of the expanded beads is preferably 1.09 or less, more preferably 1.08 or less, even more preferably 1.07 or less.

The average circularity of the expanded beads is preferably of 0.987 or more, more preferably of 0.989 or more, even more preferably 0.990 or more.

The method for producing the expanded beads of the present invention is not particularly limited as long as it is a production method that can control the average aspect ratio of the expanded beads to 1.10 or less and an average circularity thereof to 0.985 or more.

In view of easily producing expanded beads having such characteristics, the expanded beads of the present invention are preferably produced according to the production method having the following steps.

Specifically, the method for producing the expanded beads of the present invention preferably includes the following step (A), step (B), step (C), and step (D).

Step (A) (dispersing step): dispersing base polymer particles including the TPO and a crosslinking agent in a dispersion medium in a closed vessel;

Step (B) (crosslinking step): heating the inside of the closed vessel to a temperature equal to or higher than the temperature at which the base polymer particles become softened to impregnate the base polymer particles with the crosslinking agent and heating the base polymer particles to a temperature equal to or higher than the melting point of the TPO included in the base polymer particles at which the crosslinking agent is substantially decomposed (sometimes referred to as "crosslinking temperature") to crosslink the TPO, thereby obtaining crosslinked base polymer particles;

Step (C) (blowing agent-impregnating step): impregnating the base polymer particles or the crosslinked base polymer particles with a blowing agent:

Step (D) (expanding step): discharging the crosslinked base polymer particles impregnated with the blowing agent together with the dispersion medium at a temperature around the melting point of the TPO to an atmosphere at a pressure lower than that in the closed vessel to foam and expand the crosslinked base polymer particles, thereby producing expanded beads.

In step (B), the content of the closed vessel is heated while stirring the content, to thereby crosslink the TPO. When the base polymer particles are heated to a temperature within a specific range while allowing the crosslink of the TPO to proceed at an appropriate rate under stirring at an appropriate speed, the base polymer particles can be spheronized while preventing the base polymer particles from adhering each other. Furthermore, in step (D), when expanding the spheronized base polymer particles at a temperature around the melting temperature of the TPO, the crosslinked base polymer particles are expanded while keeping the shape thereof, and thus spherical expanded beads can be obtained.

In order to obtain expanded beads in a form closer to a true sphere, the production process of the expanded beads of the present invention preferably includes the crystallizing step of keeping the crosslinked base polymer particles at a temperature around the melting temperature of the TPO (crystallizing treatment temperature) for a certain duration to recrystallize part of the crystal of the melting TPO, thereby forming a high potential crystal having a melting temperature higher than the melting temperature inherent in the TPO. It is considered that when high potential crystals are present evenly in the TPO, the crystals function as cell nuclei upon foaming to thereby allow the crosslinked base polymer particles to expand more evenly, and therefore that expanded beads in a form closer to a true sphere can be obtained. Furthermore, it is considered that when high potential crystals are present evenly in the TPO, the TPO exhibits viscoelasticity more appropriate for expanding, and therefore that spheronized, crosslinked base polymer particles can be expanded while keeping the shape thereof. The specific conditions for these will be described later.

[Crystal Structure of Expanded Beads]

The expanded beads of the present invention preferably further have a crystal structure such that a melting peak inherent in the TPO (inherent peak) and one or more melting peaks on a higher temperature side than the inherent peak (high temperature peaks) appear on a DSC curve obtained when heating the expanded beads from 23° C. to 200° C. at a heating rate of 10° C./min.

Such a crystal structure will be described with reference to FIG. 1.

FIG. 1 shows a DSC (Differential scanning calorimetry) curve on the first heating of the expanded beads of the present invention. FIG. 1 is an exemplary DSC curve obtained when heating 1 to 3 mg of the expanded beads from 23° C. to 200° C. at a heating rate of 10° C./min. The ordinate axis of the graph indicates the difference in the input of the thermal energy applied per unit time between a specimen and a reference substance, the thermal energy being applied so as to allow the both to be at the same temperature, and a downward peak and a upward peak from the base line are an endothermic peak and an exothermic peak, respectively. The abscissa axis indicates a temperature, and the left side and the right side are the low temperature side and the high temperature side, respectively.

In FIG. 1, the DSC curve has a melting peak $P_a$ at a peak temperature $PT_{ma}$ on the lower temperature side and a melting peak $P_b$ at a peak temperature $PT_{mb}$ on the higher temperature side. In the present invention, the melting peak $P_a$ on the lower temperature side is referred to as an inherent peak, and the melting peak $P_b$ on the higher temperature side is referred to as a high temperature peak, which are sometimes referred to as the inherent peak $P_a$ and the high temperature peak $P_b$, respectively, hereinbelow.

The inherent peak $P_a$ is a melting peak derived from the crystal structure which the TPO forming the expanded beads inherently has, and the high temperature peak $P_b$ is a melting peak derived from the crystal structure formed due to the production process of the expanded beads.

When the weight of a single expanded bead is over 3 mg, the expanded bead is cut evenly so that the weight of the cut piece is in the range of 1 to 3 mg, the cut piece being used as a measuring sample. When the weight of a single expanded bead is less than 1 mg, a plurality of the expanded beads whose total weight is in the range of 1 to 3 mg are used as a measuring sample.

By keeping the crosslinked base polymer particles at a temperature around the melting temperature of the TPO for a certain duration, part of the crystal of the melting TPO in the crosslinked base polymer particles is recrystallized, thereby forming a high potential crystal having a thick lamella and a higher melting temperature than the melting temperature inherent in the TPO. At this time, a partial crystal of the TPO (crystal inherent in the TPO or part thereof) is melting and is to have a higher potential crystal. When such crosslinked base polymer particles are expanded, part of the melting crystal inherent in the TPO is recrystallized by cooling down upon expanding, and expanded beads can be obtained that have a crystal structure including the crystal inherent in the TPO as well as the high potential crystal. Thus, an inherent peak and a high temperature peak appear on the DSC curve.

For the expanded beads of the present invention, it is preferable that in the DSC curve, the ratio of the heat of melting of the high temperature peak(s) to the total heat of the inherent peak and the high temperature peak(s) (hereinafter also referred to as the "total heat of melting") be 0.1 to 0.5. For the expanded beads, the total heat of melting is preferably 20 to 60 J/g, and more preferably 25 to 55 J/g.

In the case of the DSC curve shown in FIG. 1, the total heat of melting in the DSC curve is determined as follows.

The point corresponding to the melting end temperature on the DSC curve is designated as β. The intersection of the tangential line and the DSC curve on the lower temperature side than the melting end temperature (β) is designated as α, the tangential line being on the baseline of the DSC curve on the higher temperature side than the end temperature (β). The point on the DSC curve corresponding to the valley between the inherent peak $P_a$ and the high temperature peak $P_b$ is designated as y, and a straight line parallel to the ordinate axis of the graph is drawn from the point y. The intersection of the straight parallel line and the straight line (α-β), with which the point α and the point β are connected, is designated as δ.

The area of the inherent peak $P_a$, (A), corresponds to the heat of the inherent peak $P_a$, and is defined as the area of the region surrounding with the DSC curve forming the inherent peak $P_a$, the line segment (α-δ), and the line segment (y-δ).

The area of the high temperature peak $P_b$, (B), corresponds to the heat of the high temperature peak $P_b$, and is defined as the area of the region surrounding with the DSC curve forming the high temperature peak $P_b$, the line segment (δ-β), and the line segment (y-δ).

The total heat of melting corresponds to the peak area surrounding with the straight line (α-β) and the segment of the DSC curve from the point α to the point β, and in other words, is the sum of the area of the inherent peak $P_a$, (A), and the area of the high temperature peak $P_b$, (B), i.e., [(A)+(B)].

The total heat of melting of the expanded beads depends on the amount of the crystal included in the TPO used as the raw material, and the ratio of the heat of melting of the high temperature peak(s) to the total heat of melting can be controlled by adjusting the conditions of the crystallizing step described later in producing the expanded beads.

[Content of a Fraction Insoluble in Hot Xylene]

The expanded beads of the present invention preferably have a content of a fraction insoluble in hot xylene (a content of a fraction insoluble in xylene according to the hot xylene extraction method) of 60% by weight or less (including 0), more preferably 1 to 60% by weight, and even more preferably 5 to 40% by weight.

The content of the fraction insoluble in hot xylene is one of the measures indicating the crosslinking state of the TPO forming the expanded beads.

The content of a fraction insoluble in hot xylene can be determined in the following manner. The sample weighing approximately 1 g (the weight of the sample measured is designated as G1 (g)) is boiled in 100 g of xylene for 6 hours, and then the resulting system is immediately filtered through a 100-mesh metallic mesh. Subsequently, the fraction insoluble in boiling xylene remaining on the metallic mesh is dried in a vacuum dryer at 80° C. under reduced pressure for 8 hours, and the weight of the fraction insoluble in boiling xylene is measured (the measured weight of the fraction insoluble in boiling xylene is designated as G2 (g)). The content of the fraction insoluble in hot xylene is obtained according to the following expression (1).

$$\text{Content of a fraction insoluble in hot xylene (\% by weight)} = [G2/G1] \times 100 \quad (1)$$

The content of a fraction insoluble in hot xylene in the expanded beads can be controlled by, for example, the amount of a crosslinking agent added as well as the conditions of stirring and the conditions of temperature rise when crosslinking the TPO included in the base polymer particles in a closed vessel.

(Average of Cell Diameter and Coefficient of Variation of Cell Diameter)

The coefficient of variation of the cell diameter of the expanded beads of the present invention is preferably 30% or less, more preferably 28% or less, and even more preferably 25% or less. When the coefficient of variation of the cell diameter of the expanded beads is small, the variation in the physical properties such as the compression property and rebound resilience can be further prevented.

The average of the cell diameter of the expanded beads of the present invention is preferably 20 to 100 μm, more preferably 25 to 95 μm, and even more preferably 30 to 90 μm.

The average of the cell diameter of the expanded beads can be determined in the following manner. An expanded bead is divided into almost equal two portions by a plane passing through the center of the expanded bead, and a photo of the cross section thereof is taken using a scanning electron microscope or the like. In the photo of the cross section obtained, 100 or more cells in the cross section of the expanded bead are arbitrarily selected. The area of the cross section of each cell (the area of the opening in the cross section) is measured using an image analysis software or the like, and the diameter of a virtual true circle having the same area as that of the cell is taken as the cell diameter of the cell. This operation is carried out on at least ten expanded beads, and the arithmetic mean of the cell diameter of the cells is taken as the average of the cell diameter (the average cell diameter) of the expanded beads.

The coefficient of variation of the cell diameter of the expanded beads can be determined by dividing the standard deviation of the cell diameter of the cells in the expanded beads by the average cell diameter of the cells in the expanded beads. The value of the standard deviation is given by the square root of the unbiased variance.

The average cell diameter of the expanded beads can be controlled according to any of conventionally known methods, including adjusting the amount of the blowing agent, the expanding conditions, the amount of the cell controlling agent added, and other conditions. The coefficient of variation of the cell diameter of the expanded beads tends to be small when the expanded beads have a crystal structure exhibiting a high temperature peak. It is considered that high potential crystals of the TPO are formed evenly in the base polymer particles through the crystallizing step, and that the high potential crystals function as cell nuclei in the expanding step, which result in a small coefficient of variation of the cell diameter of the expanded beads to be obtained.

The expanded beads of the present invention preferably have a 50% volume average bead diameter (d50) of 1 to 10 mm, more preferably 1.5 to 8 mm, and even more preferably 2 to 6 mm. The expanded beads of the present invention preferably provide a value of d90/d10 of 1.3 or less, more preferably 1.25 or less, and even more preferably 1.2 or less, wherein d90/d10 is obtained by dividing the 90% volume average bead diameter, d90, by the 10% volume average bead diameter, d10.

When the 50% volume average bead diameter is in the range described above, it is easy to produce expanded beads in a form closer to a true sphere, and also the packability of the expanded beads is further improved. When d90/d10 is within the range described above, the variation in the bead size of the expanded beads is small, and therefore, the variation in the mechanical strength including the compressive property and the rebound resilience is further reduced.

The 10%, 50%, and 90% volume average bead diameters (d10, d50, and d90) of the expanded beads are determined according to the bead size analyzing method thorough centrifugal sedimentation.

The 50% volume average bead diameters (d50) of the expanded beads can be controlled by, for example, adjusting the particle diameter (weight) of the base polymer particles as well as the expanding conditions such as the amount of the blowing agent, the expanding temperature, and the expanding pressure. The ratio d90/d10 can be controlled by using base polymer particles having a narrow particle size distribution in combination with a producing condition, mainly including expanding particles exhibiting a high temperature peak and expanding particles at a temperature around the melting point of the TPO.

The expanded beads of the present invention preferably have an apparent density of 30 to 300 kg/m$^3$, more preferably 60 to 280 kg/m$^3$, and even more preferably 100 to 260 kg/m$^3$.

When the expanded beads have an apparent density in the range described above, the lightweight property, flexibility, and rebound resilience of the expanded beads can be further improved, and the expanded beads particularly excellent in the lightweight property, flexibility, and rebound resilience can be obtained by in-mold molding the expanded beads. Also, it is easy to produce expanded beads in a form closer to a true sphere.

The apparent density of the expanded beads can be measured in the following manner. First, a group of the expanded beads are allowed to stand under the conditions of a relative humidity of 50%, a temperature of 23° C., and a pressure of 1 atm for 2 days. Subsequently, a measuring cylinder containing water at a temperature of 23° C. is provided, and an arbitrary amount of the group of the expanded beads (the weight of the expanded beads: W1) is immersed in water in the measuring cylinder with a tool, such as a metallic mesh. The volume V1 [L] of the group of the expanded beads is determined by reading the elevation of the water level while taking the volume of the tool, such as a metallic mesh, into consideration. The weight W1 (g) of the group of the expanded beads placed in the measuring cylinder is divided by the volume V1 (L) to thereby obtain W1/V1, the apparent density of the expanded beads.

[Thermoplastic Olefin Elastomer (TPO)]

The expanded beads of the present invention can be obtained by crosslinking the TPO included in the base polymer particles and expanding the resulting particles. The base polymer forming the base polymer particles is made of a TPO or a composition including a TPO.

Examples of the TPO include a mixture composed of a propylene-based resin as a hard segment and an ethylene-based rubber as a soft segment, and a block copolymer composed of a polyethylene block as a hard segment and an ethylene/α-olefin copolymer block as a soft segment.

For the mixture composed of a propylene-based resin as a hard segment and an ethylene-based rubber as a soft segment, examples of the propylene resin include a propylene homopolymer and a copolymer of propylene and ethylene or an α-olefin having 4 to 8 carbon atoms. Examples of the ethylene-based rubber include a copolymer of ethylene and an α-olefin having 3 to 8 carbon atoms, and a copolymer of ethylene and a non-conjugated diene such as 5-vinyl-2-norbornene, 5-ethylidene-2-norbornene, 5-methylene-2-norbornene, or dicyclopentadiene.

For the block copolymer composed of a polyethylene block as a hard segment and an ethylene/α-olefin copolymer block as a soft segment, examples of the polyethylene block include an ethylene homopolymer and a copolymer of ethylene and an α-olefin having 3 to 8 carbon atoms. Examples of the ethylene/α-olefin copolymer block include a copolymer block of ethylene and an α-olefin having 3 to 20 carbon atoms.

Examples of the α-olefin having 3 to 20 carbon atoms to be copolymerized with ethylene include propylene, 1-butene, 1-pentene, 1-hexene, 1-heptene, 1-octene, 1-nonene, 1-decene, 3-methyl-1-butene, and 4-methyl-1-pentene. Among these, propylene, 1-butene, 1-hexene, and 1-octene are preferred, and 1-octene is particularly preferred.

The proportion of the ethylene component to the polyethylene block is preferably 95% by weight or more, and more preferably 98% by weight or more, based on the weight of the polyethylene block. The proportion of the α-olefin component to the ethylene/α-olefin copolymer block is preferably 10% by weight or more, and more preferably 15% by weight or more, based on the weight of the ethylene/α-olefin copolymer block.

The proportion of the ethylene component to the polyethylene block and the proportion of the α-olefin component to the ethylene/α-olefin copolymer block can be calculated from data obtained by differential scanning calorimetry (DSC) or nuclear magnetic resonance (NMR).

Commercially available products may be used as the TPO, and examples thereof include "Thermorun" (a trade name, manufactured by Mitsubishi Chemical Corporation), "Milastomer" (a trade name, manufactured by Mitsui Chemicals, Inc.), "Sumitomo TPE" (a trade name, manufactured by Sumitomo Chemical Co., Ltd.), and "Infuse (registered trademark)" (a trade name, manufactured by The Dow Chemical Company).

(Multi-Block Copolymer)

A multi-block copolymer of a polyethylene block and an ethylene/α-olefin copolymer block (hereinafter, sometimes simply referred to as "multi-block copolymer") is particularly preferable as the TPO in view of improving recoverability at a high temperature. The polyethylene block corresponds to a hard block, and the ethylene/α-olefin copolymer block corresponds to a soft block. The hard block and the soft block are preferably arranged in a straight chain form.

Examples of the multi-block copolymer include those described in JP-A-2013-64137. Examples of the commercially available products of the multi-block copolymer include "INFUSE (registered trademark)" (a trade name, manufactured by The Dow Chemical Company).

As described above, the base polymer forming the base polymer particles is a TPO or a composition including a TPO (referred to as "TPO composition").

The TPO composition includes a polymer other than TPOs (hereinafter referred to as "other polymer") in addition to the TPO described above.

Examples of the other polymer include a thermoplastic resin, such as a polyolefin resin (for example, a polyethylene-based resin, a polypropylene-based resin, and a polybutene-based resin) and a polystyrene-based resin; a thermoplastic elastomer other than the TPO (for example, styrene-based elastomers such as block copolymers of styrene/butadiene, styrene/isoprene, styrene/butadiene/styrene, and styrene/isoprene/styrene, and hydrogenated products thereof; and polybutadiene-based elastomers).

The content of the other polymer in the TPO composition is preferably 10 parts by weight or less, and more preferably 5 parts by weight or less, per 100 parts by weight of the TPO.

The base polymer forming the base polymer particles particularly preferably consists of a TPO (preferably a block copolymer composed of a polyethylene block and an ethylene/α-olefin copolymer block).

The base polymer particles may contain various additives in addition to the base polymer as long as the objects and effects of the present invention are not impaired.

Examples of the various additives include an antioxidant, an ultraviolet absorber, an antistatic agent, a flame retardant, a flame retardant auxiliary, a metal deactivator, a conductive filler, and a cell controlling agent.

Examples of the cell controlling agent include inorganic powders, such as zinc borate, talc, calcium carbonate, borax, aluminum hydroxide, silica, zeolite, and carbon, and organic powders, such as a phosphoric acid nucleating agent, a phenol nucleating agent, an amine nucleating agent, and polyethylene fluoride resin powder. The total amount of these additives added is preferably 20 parts by weight or less, more preferably 10 parts by weight or less, and even more preferably 5 parts by weight or less, per 100 parts by weight of the base polymer. These additives are generally used in the requisite minimum amounts. The additives can be incorporated in the base polymer particles in a manner, for example, such that in the production of the base polymer particles, the additives are fed to an extruder together with a base polymer, followed by kneaded them.

(Physical Properties of Thermoplastic Olefin Elastomer (TPO))

[Melt Flow Rate (MFR)]

The melt flow rate (MFR) of the TPO at 190° C. under a load of 2.16 kg is preferably 2 to 10 g/10 min, more preferably 3 to 8 g/10 min, and even more preferably 4 to 7 g/10 min.

When the melt flow rate of the TPO is the value within the range described above, favorable expanded beads can be produced.

The melt flow rate of the TPO is a value as measured according to JIS K7210-1:2014 under conditions of a temperature of 190° C. and a load of 2.16 kg.

[Type A Durometer Hardness (Shore a Hardness)]

The type A durometer hardness (generally, also referred to as "Shore A hardness") of the TPO is preferably A65 to A90, more preferably A75 to A90, and even more preferably A76 to A88.

When the type A durometer hardness of the TPO is A65 or more, the expanded beads is unlikely to excessively contract after expanding. When the type A durometer hardness of the TPO is A90 or less, it is easy to obtain expanded beads excellent in flexibility.

The type A durometer hardness of the TPO means a durometer hardness as measured using a type A durometer according to JIS K6253-3:2012. The measuring time is 3 seconds.

[Density, Melting Point]

The density of the TPO is preferably 700 to 1000 kg/m$^3$, and more preferably 800 to 900 kg/m$^3$.

The melting point of the TPO is preferably 110 to 130° C., and more preferably 115 to 125° C.

When the melting point of the TPO is in the range described above, the compression set at a high temperature, for example, 50° C., can be low.

The melting point of the TPO means the melting peak temperature as measured by the heat flux differential scanning calorimetry (DSC) described in JIS K7121-1987. For the conditioning of the specimen, the contents of "(2) Cases where the melting temperature is measured after a prescribed heat treatment" are adopted. The heating rate and the cooling rate are each 10° C./min. When a plurality of melting peaks appear on the DSC curve, the peak temperature of the melting peak having the largest area is taken as the melting point.

[Flexural Modulus]

The flexural modulus of the TPO is preferably 10 to 30 MPa, and more preferably 12 to 30 MPa.

The flexural modulus of the TPO is measured according to the measurement method described in JIS K7171:2008.

<Method for Producing Expanded Beads>

As described above, the method for producing expanded beads of the present invention is not particularly limited as long as it can control the average aspect ratio and average circularity of the expanded beads to 1.10 or less and 0.985 or more, respectively; however, the method preferably includes the steps (A), (B), (C), and (D) described above.

Expanded beads having an average aspect ratio of 1.10 or less and an average circularity of 0.985 or more can be obtained by allowing the process to proceed while stirring the content of the closed vessel in at least step (B). For easily obtaining spheronized expanded beads, it is preferable to allow the process to proceed while stirring the content of the closed vessel in steps (A) and (C) in addition to step (B).

The stirring rate for stirring the content of the closed vessel (the number of revolutions of the motor of the stirrer) is preferably 150 to 400 rpm, and more preferably 200 to 350 rpm, in view of easily obtaining expanded beads having an average aspect ratio of 1.10 or less and an average circularity of 0.985 or more.

1. Step (A) (Dispersing Step)

In step (A), base polymer particles including a TPO and a crosslinking agent are dispersed in a dispersion medium in a closed vessel.

(Production of Base Polymer Particles)

The base polymer particles including the TPO can be produced according to a known granulation method.

The method for producing the base polymer particles is not particularly limited, and may be, for example, a strand cutting method, which includes feeding the base polymer including the TPO and additives such as a cell controlling agent if needed to an extruder, kneading them while melting the base polymer to form a molten kneaded material, extruding the molten kneaded material into a strand form through a small hole(s) of a die attached to the extruder, cooling the strand with water, and then cutting the strand to a prescribed length to obtain base polymer particles. Alternatively, the base polymer particles can be obtained by a hot cutting method, in which the molten kneaded material is cut in a gas phase immediately after extruding the molten kneaded material through a small hole(s); an underwater cutting method, in which the molten kneaded material is cut in water immediately after extruding the molten kneaded material through a small open hole(s); or other methods.

Generally, the average weight per single base polymer particle is preferably 0.01 to 10 mg, and more preferably 0.1 to 5 mg. The average weight of the base polymer particles is a value that is obtained by dividing the total weight (mg) of 100 base polymer particles arbitrarily selected by 100. The weight of the base polymer particles can be adjusted by adjusting the open diameter of the small hole, the amount extruded, and the rate of cutting.

(Dispersion Medium)

The dispersion medium used in step (A) is not particularly limited as long as the dispersion medium does not dissolve the base polymer particles. Examples of the dispersion medium include water, ethylene glycol, glycerin, methanol, and ethanol. The dispersion medium is preferably water.

It is preferable that when the base polymer particles are dispersed in the dispersion medium, the base polymer particles be dispersed in the dispersion medium while stirring the dispersion medium using, for example, a stirrer.

In step (A), a dispersant may be added to the dispersion medium.

Examples of the dispersant include organic dispersants such as polyvinyl alcohol, polyvinylpyrrolidone, and methyl cellulose, and sparingly dissolving inorganic salts such as aluminum oxide, zinc oxide, kaolin, mica, magnesium phosphate, and tricalcium phosphate.

A surfactant may also be added to the dispersion medium.

Examples of the surfactant include sodium oleate, sodium dodecylbenzenesulfonate, sodium alkylbenzenesulfonate, and other anionic surfactants and nonionic surfactants that are generally used for suspension polymerization.

A pH regulator may also be added to the dispersion medium to regulate the pH of the dispersion medium.

Examples of the pH regulator include carbon dioxide.

A blowing agent may also be added to the dispersion medium. Details of the blowing agent will be described in the description for step (C).

(Closed Vessel)

The closed vessel used in step (A) is not particularly limited as long as the vessel can be closed air-tightly. The inside of the closed vessel is heated to increase the pressure inside the closed vessel in step (B) described later, and therefore it is necessary for the closed vessel to withstand heating and the pressure increase in the step (B). Examples of the closed vessel include an autoclave.

(Crosslinking Agent)

A crosslinking agent is used in order to crosslink the TPO included in the base polymer particles.

The crosslinking agent may be added to the dispersion medium in advance. Alternatively, after dispersing the base polymer particles in the dispersion medium, the crosslinking agent may be added thereto.

The crosslinking agent is not particularly limited as long as the crosslinking agent can crosslink the TPO. In view of easily obtaining spherical expanded beads, it is preferable to use as the crosslinking agent a peroxide having a 10 hour half-life temperature of 100 to 125° C., such as dicumyl peroxide (10 hour half-life temperature: 116° C.) and 2,5-t-butylperbenzoate (10 hour half-life temperature: 104° C.). These are used singly or in combinations of two or more thereof.

The amount of the crosslinking agent added to the dispersion medium is not particularly limited as long as it can adjust the content of the fraction insoluble in hot xylene in the expanded beads in the range described above. When using dicumyl peroxide as the crosslinking agent, the amount thereof added is preferably 0.2 to 0.9 parts by weight, more preferably 0.3 to 0.8 parts by weight, and even more preferably 0.4 to 0.8 parts by weight, per 100 parts by weight of the base polymer particles.

2. Step (B) (Crosslinking Step)

In step (B), the inside of the closed vessel is heated to a temperature equal to or higher than the temperature at which the base polymer particles become softened to impregnate the base polymer particles with the crosslinking agent, and the base polymer particles is also heated to a temperature equal to or higher than the melting point of the TPO at which the crosslinking agent is substantially decomposed (sometimes referred to as "crosslinking temperature") as well, for example, a temperature around the 1 minute half-life temperature of the crosslinking agent, to crosslink the TPO.

In step (B), (1) after impregnating the base polymer particles with the crosslinking agent, the crosslinking agent may be decomposed to crosslink the TPO; or (2) while impregnating the base polymer particles with the crosslinking agent, the crosslinking agent may be decomposed to crosslink the TPO In case (1), the base polymer particles is impregnated with the crosslinking agent preferably at a temperature at which the base polymer particles can be impregnated with the crosslinking agent but at which the crosslinking agent is not substantially decomposed, that is, which is a temperature lower than a temperature at which the crosslinking of the TPO included in the base polymer particles starts (sometimes referred to as "impregnating temperature"). Specifically, for the impregnating temperature, the temperature of the inside of the closed vessel is preferably in the range of "Tm−20° C." to "the 10 hour half-life temperature of the crosslinking agent+10° C.", wherein Tm represents the melting point of the TPO as a raw material, and is preferably in the range of "Tm−10° C." to "the 10 hour half-life temperature of the crosslinking agent". When two or more kinds of crosslinking agents are used, the range is defined on the basis of the crosslinking agent whose 10 hour half-life temperature is lowest among them. The keeping time at the impregnating temperature is preferably 15 to 60 minutes, and more preferably 30 to 45 minutes.

Then, the inside of the closed vessel is heated to a temperature equal to or higher than the melting point of the TPO at which the crosslinking agent is substantially decomposed (a crosslinking temperature) as well, and the crosslinking temperature is kept to crosslink the TPO included in the base polymer particles. Specifically, for the crosslinking temperature, the temperature of the inside of the closed vessel is preferably "Tm+10° C." to "Tm+50° C.", and more preferably "Tm+15° C." to "Tm+45° C.", wherein Tm represents the melting point of the TPO as a raw material, in view of obtaining spherical expanded beads. If the rate of temperature rise is too high, the base polymer particles are unlikely to be spheronized because crosslinking proceeds before the base polymer particles are spheronized, and thus it is difficult to obtain spherical crosslinked base polymer particles. On the other hand, if the rate of temperature rise is too low, the base polymer particles during crosslinking easily adhere to each other. The rate of temperature rise to the crosslinking temperature is preferably 0.5 to 5° C./min, and more preferably 1 to 2° C./min. The keeping time at the crosslinking temperature is preferably 15 to 60 minutes, and more preferably 30 to 45 minutes. The temperature at which the crosslinking agent is substantially decomposed means the one minute half-life temperature of the crosslinking agent—20° C. or more.

In case (2), the inside of the closed vessel is preferably heated to the crosslinking temperature at an almost constant rate of temperature rise and kept at the crosslinking temperature for a certain duration, to thereby decompose the crosslinking agent to crosslink the TPO while impregnating the base polymer particles with the crosslinking agent. If the rate of temperature rise is too high, crosslinking of the TPO starts before the crosslinking agent penetrates the middle of the base polymer particle, and crosslinking proceeds before the base polymer particles are spheronized; thus, it is difficult to spheronize the base polymer particles and therefore it is difficult to obtain spherical crosslinked base polymer particles. On the other hand, if the rate of temperature rise is too low, the base polymer particles during crosslinking easily adhere to each other. The rate of temperature rise is preferably 0.5° C./min to 5° C./min, and more preferably 1° C./min to 2° C./min. For the crosslinking temperature, the temperature of the inside of the closed vessel is preferably in the range of "Tm" to "Tm+60° C.", and more preferably in the range of "Tm+10° C." to "Tm+50° C.", wherein Tm represents the melting point of the TPO as a raw material, in view of easily spheronizing the crosslinked base polymer particles. The keeping time at the crosslinking temperature is preferably 15 to 60 minutes, and more preferably 30 to 45 minutes.

Crosslinking of the TPO may be conducted under the combined conditions of (1) and (2).

In the crosslinking step, the stirring rate of the content of the closed vessel (the number of revolutions of the stirring blade) is preferably 150 to 400 rpm, and more preferably 200 to 350 rpm in addition to the conditions for crosslinking described above, in order to obtain spherical crosslinked base polymer particles.

3. Step (C) (Blowing Agent-Impregnating Step)

In step (C), a blowing agent is added to the content of the closed vessel to impregnate the base polymer particles or the crosslinked base polymer particles with the blowing agent.

Step (C) may be carried out at any point before step (D). Specifically, step (C) may be carried out at any point during step (A), after step (A) before step (B), during step (B), or after step (B) before step (D), and may also be carried out at two or more points of these.

Thus, the base polymer particles are impregnated with the blowing agent, in the case where step (C) is carried out before crosslinking of the TPO; the base polymer particles in which crosslinking of the TPO is proceeding are impregnated with the blowing agent, in the case where step (C) is carried out during crosslinking in progress; and the crosslinked base polymer particles are impregnated with the blowing agent, in the case where step (C) is carried out after crosslinking of the TPO.

(Blowing Agent)

The blowing agent used in step (C) is not particularly limited, as long as the blowing agent can expand the crosslinked base polymer particles. Examples of the blowing agent include an inorganic physical blowing agent, such as air, nitrogen, carbon dioxide, argon, helium, oxygen, and neon, and an organic physical blowing agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, the inorganic physical blowing agent is preferred since it does not deplete the ozone layer and is inexpensive. Nitrogen, air, and carbon dioxide are more preferred, and carbon dioxide is particularly preferred. These may be used singly or in combinations of two or more thereof.

When the blowing agent is added to the content of the closed vessel, the amount of the blowing agent added is determined in consideration of the intended apparent density of the expanded beads, the kind of the TPO, the kind of the blowing agent, and others, as described later, and is generally preferably 5 to 50 parts by weight for the organic physical blowing agent and preferably 0.5 to 30 parts by weight for the inorganic physical blowing agent, per 100 parts by weight of the base polymer particles or the crosslinked base polymer particles. The blowing agent-impregnating step described above and the expanding step are preferably carried out as a series of steps in a single closed vessel.

(Method for Impregnation)

The method for impregnating the base polymer particles or the crosslinked base polymer particles with the blowing agent is not particularly limited, and for example, the blowing agent is added to the content of the closed vessel to impregnate either of the softened base polymer particles or the softened crosslinked base polymer particles or both of them with the blowing agent. Preferably, the blowing agent-impregnating step is allowed to proceed while stirring the content including either of the base polymer particles or the crosslinked base polymer particles or both of them in the closed vessel.

The temperature for impregnating with the blowing agent is not particularly limited, as long as it is equal to or higher than the temperature at which the base polymer particles or the crosslinked base polymer particles are in a softening state. For example, the temperature of the inside of the closed vessel is preferably in the range of "Tm−20° C." to "Tm+60° C.", wherein Tm represents the melting point of the TPO as a raw material.

4. Crystallizing Step

For obtaining expanded beads in a form closer to a true sphere, it is preferable to keep the inside of the closed vessel at a temperature around the melting point of the TPO to recrystallize part of the crystal of the melting TPO in the crosslinked base polymer particles, thereby forming a high potential crystal.

In the crystallizing step, (1) the inside of the closed vessel after step (B) may be cooled from the crosslinking temperature in step (B) to a temperature around the melting point of the TPO. Alternatively, the following procedure may be adopted: (2) after the content of the closed vessel is cooled, the crosslinked base polymer particles are taken out of the closed vessel, and then the crosslinked base polymer particles are dispersed in a dispersion medium in a closed vessel, followed by heating the inside of the closed vessel to a temperature around the melting point of the TPO.

In case (1), preferably, the content of the closed vessel after step (B) is cooled to a temperature around the melting point of the TPO and then kept at this temperature (crystallizing treatment temperature) for a certain duration. The rate of temperature fall from the crosslinking temperature (rate of temperature fall) is preferably 0.3° C./min to 5° C./min, and more preferably 0.5° C./min to 3° C./min.

In case (2), the following procedure is preferable: after the content of the closed vessel after step (B) is cooled to a predetermined temperature, the crosslinked base polymer particles are taken out of the closed vessel and then dispersed in a dispersion medium in a closed vessel, and the content of the closed vessel is heated to a temperature around the melting point of the TPO, followed by keeping the content of the closed vessel at this temperature (crystallizing treatment temperature) for a certain duration. The rate of temperature rise to the temperature around the melting point of the TPO (rate of temperature rise) is preferably 0.3° C./min to 5° C./min, and more preferably 0.5° C./min to 3° C./min.

When the crystallizing step is carried out as in case (1) or (2) described above, part of the melting crystal of the TPO in the crosslinked base polymer particles is easily recrystallized, to thereby form a high potential crystal having a thick lamella. When crosslinked base polymer particles having such a high potential crystal are expanded in step (D), expanded beads can be obtained that have a crystal structure including a crystal formed by cooling upon expansion as well as the high potential crystal. Thus, an inherent peak and a high temperature peak on the DSC curve are formed.

The crystallizing treatment temperature for produce a high potential crystal is preferably in the range of "Tm−10° C." to the melting end temperature of the TPO, wherein Tm represents the melting point of the TPO as a raw material, and more preferably in the range of "Tm−5° C." to the melting end temperature. Crystallizing may be carried out at a constant temperature or may be carried out while the temperature varies within the temperature range described above.

The crystallizing treatment temperature in the crystallizing step as in case (1) or (2) described above is preferably kept for a certain duration. The time for keeping the crystallizing treatment temperature is preferably 3 to 60 minutes, and more preferably 5 to 30 minutes.

As the crystallizing treatment temperature is higher, the melting peak temperature of the melting peak appearing on the higher temperature side than the inherent peak (a high temperature peak) tends to be lower. As the time for keeping the crystallizing treatment temperature is longer, the heat of melting of the high temperature peak(s) tends to be larger.

The melting point Tm and the melting end temperature of the TPO as a raw material mean the melting peak temperature and the extrapolated end temperature of melting, respectively, as measured according to the heat flux differential scanning calorimetry described in JIS K7121-1987. The content of "(2) For Measurement of Melting Temperature after Definite Heat Treatment" is applied for the conditioning of the specimen, and the heating rate and the cooling rate are both 10° C./min.

5. Step (D) (Expanding Step)

In step (D), the crosslinked base polymer particles having been impregnated with the blowing agent are discharged at a temperature around the melting point of the TPO together with the dispersion medium from the closed vessel to an atmosphere at a pressure lower than the pressure in the closed vessel, usually an atmospheric pressure, to expand the crosslinked base polymer particles, thereby producing expanded beads. The temperature of the inside of the closed vessel upon expanding (expanding temperature) is preferably in the range of "Tm−10° C." to the melting end temperature of the TPO, wherein Tm represents the melting point of the TPO as a raw material, and more preferably in the range of "Tm−8° C." to Tm. It is considered that when the crosslinked base polymer particles are expanded at a temperature described above in step (D), the crosslinked TPO exhibits a viscoelasticity appropriate for expanding so that the crosslinked base polymer particles are evenly expanded. It is considered that the spheronized, crosslinked base polymer particles are thus expanded while keeping the form thereof, and therefore that spherical expanded beads can be obtained. For more evenly expanding the crosslinked base polymer particles, the pressure of the inside of the closed vessel upon expanding (expanding pressure) is preferably 1.0 MPa (G; gauge pressure) or more, more preferably 1.5 MPa (G) to 5.0 MPa (G), and even more preferably 2.0 to 4.5 MPa (G).

As the method for producing the expanded beads, the method for producing the expanded beads in a closed vessel has been described, but the method for producing the expanded beads is not limited to the production method described above.

For example, a method may be adopted that includes feeding a base polymer including a TPO and an blowing agent to an extruder, kneading them to form a kneaded material, extruding the kneaded material through a die attached to the tip of the extruder to thereby expand the material, and cutting the resulting expanded product into the form of beads; or a method may be adopted that includes impregnating base polymer particles with an blowing agent in a closed vessel, taking the base polymer particles containing the blowing agent out of the closed vessel, and heating the base polymer particles with a heating medium to expand the base polymer particles to thereby obtain expanded beads.

Expanded beads having an average aspect ratio of 1.10 or less and an average circularity of 0.985 or more are easily obtained through steps (A) to (D).

When the expanded beads have a crystal structure such that a melting peak inherent in the thermoplastic olefin elastomer (TPO) (inherent peak) and one or more melting peaks on a higher temperature side than the inherent peak (high temperature peaks) appear on a DSC curve obtained when heating the expanded beads from 23° C. to 200° C. at a heating rate of 10° C./min, the high temperature peaks appear on the DSC curve obtained in the first heating of the expanded beads; however, any high temperature peaks do not appear on a DSC curve that is obtained when the expanded beads after the first heating are cooled from 200° C. to 23° C. at a cooling rate of 10° C./min and again heated from 23° C. to 200° C. at a heating rate of 10° C./min. Because only an endothermic peak similar to the inherent peak appears on the DSC curve obtained in the second heating, the inherent peak and the high temperature peak(s) can be easily distinguished.

<Molded Article of Expanded Beads>

The expanded beads of the present invention can be used as they are, without in-mold molding; however, by in-mold molding the expanded beads, a molded article of the expanded beads can be obtained.

A molded article of the expanded beads that has uniform physical properties such as the compressive property and the rebound resilience can be obtained by subjecting the expanded beads of the present invention to in-mold molding.

(In-Mold Molding)

A mold is filled with the expanded beads and the expanded beads are heated with a heating medium such as steam for the secondary expansion while fusion bonding the expanded beads to each other according to a conventionally known method, thereby obtaining a molded article of the expanded beads having the shape of the molding cavity.

EXAMPLES

The present invention will be described in further details by way of Examples, but the present invention is in no way limited thereby.
<Thermoplastic Olefin Elastomer (Base Polymer)>
(TPO 1)

As a base polymer, a thermoplastic olefin elastomer was used that was a multi-block copolymer composed of a polyethylene as a hard block and an ethylene/α-olefin copolymer as a soft block ("INFUSE (registered trademark) 9530", manufactured by The Dow Chemical Company (designated as "TPO 1" in Tables 1 and 2).

TPO 1 had a density of 887 kg/m$^3$, a type A durometer hardness of A86, a melt flow rate of 5.4 g/10 min, a melting point of 117° C., and an melting end temperature of 123° C.
(TPO 2)

As a base polymer, a thermoplastic olefin elastomer was used that was a multi-block copolymer composed of a polyethylene as a hard block and an ethylene/α-olefin copolymer as a soft block ("INFUSE (registered trademark) 9500", manufactured by The Dow Chemical Company (designated as "TPO 2" in Tables 1 and 2).

TPO 2 had a density of 877 kg/m$^3$, a type A durometer hardness of A76, a melt flow rate of 5.7 g/10 min, a melting point of 118° C., and an melting end temperature of 123° C.
[Physical Properties of TPO]
(Density, Type A Durometer Hardness, and Melt Flow Rate)

The density of the TPO was determined according to ASTM D792-13.

The type A durometer hardness of the TPO was determined according to JIS K6253-3:2012. The measuring time was 3 seconds.

The melt flow rate of the TPO was determined according to JIS K7210-1:2014 under conditions of a temperature of 190° C. and a load of 2.16 kg.
(Melting Point and Melting End Temperature)

The melting peak temperature and the melting end temperature of the TPO were determined according to JIS K7121-1987. Specifically, the melting peak temperature (melting point) and the melting end temperature of the TPO were determined using about 5 mg of the TPO pellets as a specimen by the heat flux differential scanning calorimetry under the conditions of a heating rate of 10° C./min, a cooling rate of 10° C./min, and a nitrogen flow rate of 10 mL/min as well as adopting the contents of "(2) For Measurement of Melting Temperature after Definite Heat Treatment" for the conditioning of the specimen. A heat flux differential scanning calorimeter (manufactured by SII Nano Technology Inc., model number: DSC7020) was used as a measurement device.
<Preparation of Expanded Beads>

Next, the method for preparing expanded beads according to Examples and Comparative Examples will be described. Expanded beads were prepared under the conditions shown below (see Tables 1 and 2).

Example 1

[Preparation of Base Polymer Particles]
TPO 1 (100 parts by weight) as a base polymer and 0.1 parts by weight of a zinc borate (sometimes abbreviated as ZnB; "Zinc borate 2335", manufactured by Tomita Pharmaceutical co., ltd., average particle diameter d50: 6 μm) as a cell controlling agent were fed to an extruder and kneaded while melting TPO 1. The kneaded material was then extruded into a strand form through a die having a hole diameter of 2 mm, and the strand was cooled in water and cut using a pelletizer so as to satisfy a particle weight of about 5 mg, thereby obtaining base polymer particles.

On 100 arbitrary selected base polymer particles (mini pellets), the maximum length (L) and the maximum diameter (D) in the cross section of the body of the base polymer particle perpendicular to the lengthwise direction of the maximum length were measured, and the ratio (L/D) was calculated. The arithmetical mean thereof was found to be 1.3.
[Preparation of Expanded Beads]
1. Step (A)

In an autoclave having a volume of 5 L, 3 L of water as a dispersion medium was placed, and 1 kg of the base polymer particles was dispersed in the dispersion medium while stirring at 270 rpm.

To the dispersion medium, 3 g of kaolin as a dispersing agent, 0.04 g of an sodium alkylbenzenesulfonate as a surfactant, and 8 g of PERCUMIL D [DCP; dicumyl peroxide (10 hour half-life temperature; 116° C.)] manufactured by NOF CORPORATION (corresponding to 0.8 part by weight per 100 parts by weight of the base polymer particles) as a crosslinking agent were added, and 70 g of dry ice (corresponding to 7 parts by weight per 100 parts by weight of the base polymer particles) as an blowing agent was placed therein.
2. Steps (B) and (C)

While keeping the stirring rate, the content of the autoclave was heated to 160° C. (crosslinking temperature) at a rate of temperature rise of 1.5° C./min and kept at 160° C. for 30 minutes to crosslink the TPO included in the base polymer particles [step (B)] and also to impregnate the crosslinked base polymer particles with the blowing agent [step (C)].
3. Steps (D)

Then, the inside of the autoclave was cooled to 111° C. (crystallizing treatment temperature), and kept at 111° C. for 30 minutes while injecting carbon dioxide into the autoclave so as to keep a pressure of 4.0 MPa (G) in the autoclave. Then, after stopping stirring, the content of the autoclave was discharged at an expanding temperature of 111° C. to an atmosphere at an atmospheric pressure to foam and expand the crosslinked base polymer particles, thereby obtaining expanded beads. The pressure in the autoclave just before discharging the content of the autoclave was 4.0 MPa (G). Although the content was kept at 111° C. for 30 minutes, any high temperature peaks were not formed.

Example 2

Expanded beads were produced in the same manner as in Example 1, except the following: the amount of the crosslinking agent added was changed to 0.6 part by weight; after step (B), the content of the autoclave was cooled to a temperature of 112° C. (crystallizing treatment temperature), and kept at 112° C. for 30 minutes while injecting carbon dioxide in the autoclave so as to keep a pressure of 4.0 MPa (G) in the autoclave, to thereby form a high potential crystal (crystallizing step), and then stirring was stopped; and the expanding temperature in step (D) was changed to 112° C.

Example 3

Expanded beads were produced in the same manner as in Example 1, except the following: the amount of the crosslinking agent added was changed to 0.5 part by weight; after step (B), the content of the autoclave was cooled to a temperature of 113° C. (crystallizing treatment temperature), and kept at 113° C. for 30 minutes while injecting carbon dioxide in the autoclave so as to keep a pressure of 4.0 MPa (G) in the autoclave, to thereby form a high potential crystal (crystallizing step), and then stirring was stopped; and the expanding temperature in step (D) was changed to 113° C.

Example 4

Expanded beads were produced in the same manner as in Example 1, except the following: after step (B), the content of the autoclave was cooled to a temperature of 113° C. (crystallizing treatment temperature), and kept at 113° C. for 30 minutes while injecting carbon dioxide in the autoclave so as to keep a pressure of 4.0 MPa (G) in the autoclave, to thereby form a high potential crystal (crystallizing step), and then stirring was stopped; and the expanding temperature in step (D) was changed to 113° C.

Example 5

Expanded beads were produced in the same manner as in Example 1, except the following: the amount of the cross-linking agent added was changed to 0.5 part by weight; after step (B), the content of the autoclave was cooled to a temperature of 114° C. (crystallizing treatment temperature), and kept at 114° C. for 30 minutes while injecting carbon dioxide in the autoclave so as to keep a pressure of 4.0 MPa (G) in the autoclave, to thereby form a high potential crystal (crystallizing step), and then stirring was stopped; and the expanding temperature in step (D) was changed to 114° C.

Example 6

Expanded beads were produced in the same manner as in Example 1, except the following: the amount of the blowing agent added was changed to 5 parts by weight; the amount of the crosslinking agent added was changed to 0.4 part by weight; after step (B), the content of the autoclave was cooled to a temperature of 115° C. (crystallizing treatment temperature), and kept at 115° C. for 30 minutes while injecting carbon dioxide in the autoclave so as to keep a pressure of 3.0 MPa (G) in the autoclave, to thereby form a high potential crystal (crystallizing step), and then stirring was stopped; and the expanding temperature in step (D) was changed to 115° C. The pressure in the autoclave just before discharging the content of the autoclave was 3.0 MPa (G).

Example 7

Expanded beads were produced in the same manner as in Example 5, except that TPO 2 was used as a TPO.

Comparative Example 1

The dispersing agent, the surfactant, and the crosslinking agent, the base polymer particles, and the blowing agent were added to the dispersion medium in an autoclave, in the same manner as in step (A) in Example 1. Then, while stirring at 270 rpm, the content of the autoclave was heated to a temperature of 160° C. (crosslinking temperature) and kept at this temperature for 30 minutes, in the same manner as in step (B) in Example 1. Then, without falling the temperature of the content in the autoclave, the content was discharged at an expanding temperature of 160° C. to an atmosphere at an atmospheric pressure, thereby obtaining expanded beads. The pressure in the autoclave just before discharging the content of the autoclave was 4.0 MPa (G).

Comparative Example 2

Expanded beads were produced in the same manner as in Comparative Example 1, except that the amount of the blowing agent added was changed to 4.0 parts by weight. The pressure in the autoclave just before discharging the content of the autoclave was 2.5 MPa (G).

Comparative Example 3

Expanded beads were produced in the same manner as in Comparative Example 1, except that the amount of the blowing agent added was changed to 2.0 parts by weight. The pressure in the autoclave just before discharging the content of the autoclave was 1.5 MPa (G).

Comparative Example 4

Expanded beads were obtained in the same manner as in Comparative Example 1, except the following: Trigonox 117 manufactured by KAYAKU AKZO CO., LTD. [TRX117; t-butylperoxy-2-ethylhexyl monocarbonate (10 hour half-life temperature: 99° C.)] was added, instead of DCP, as a crosslinking agent in an amount of 1.0 part by weight per 100 parts by weight of TPO 1; and the amount of the blowing agent added was changed to 3 parts by weight. The pressure in the autoclave just before discharging the content of the autoclave was 2.0 MPa (G).

Comparative Example 5

Expanded beads were produced in the same manner as in Comparative Example 4, except that the amount of the crosslinking agent added was changed to 0.9 part by weight. The pressure in the autoclave just before discharging the content of the autoclave was 2.2 MPa (G).

Comparative Example 6

Expanded beads were produced in the same manner as in Comparative Example 5, except the following: the amount of the blowing agent added was changed to 7.0 parts by weight; the crosslinking temperature in step (B) was 140° C.; after step (B), the content of the autoclave was cooled to a temperature of 113° C. (crystallizing treatment temperature), and kept at 113° C. for 30 minutes while injecting carbon dioxide so as to keep a pressure of 4.0 MPa (G) in the autoclave (crystallizing step), and then stirring was stopped; and the expanding temperature in step (D) was changed to 113° C. The pressure in the autoclave just before discharging the content of the autoclave was 4.0 MPa (G).

Comparative Example 7

Expanded beads were produced in the same manner as in Comparative Example 6, except that the crosslinking temperature in step (B) was changed to 160° C.

Comparative Example 8

Expanded beads were produced in the same manner as in Example 3, except that the amount of the crosslinking agent added was changed to 1.0 part by weight.

Comparative Example 9

Expanded beads were produced in the same manner as in Example 5, except that the amount of the crosslinking agent added was changed to 1.2 parts by weight.

<Properties of Expanded Beads>

On the expanded beads according to Examples and Comparative Examples, determined or calculated were the apparent density, the content of the fraction insoluble in hot xylene, the peak temperature of the inherent peak, the peak temperature of the high temperature peak, the heat of the high temperature peak, the total heat of melting, the average of the cell diameter (the average cell diameter), the coefficient of variation of the cell diameter, the average aspect ratio, the average circularity, and 10%, 50%, 90% volume average bead diameter (d10, d50, d90) and d90/d10 of the expanded beads. The results are shown in the column of "Expanded beads" in Tables 1 and 2.

(Apparent Density of Expanded Beads)

100 mL of ethanol at 23° C. was placed in a 200-mL measuring cylinder. The expanded beads in a bulk volume of about 50 mL, the weight Wa (g) of which had been measured in advance, were immersed in ethanol using a metallic mesh, and the volume Va ($cm^3$) corresponding to the elevation of the water level was read. Wa/Va was calculated and taken as the apparent density ($kg/m^3$) of the expanded beads.

The determination was carried out at an air temperature of 23° C. and a relative humidity of 50% under atmospheric pressure.

(Content of a Fraction Insoluble in Hot Xylene in Expanded Beads)

Approximately 1 g of a sample of expanded beads was weighed, which was taken as the sample weight W1b. The expanded beads weighed were placed in a 150-mL round-bottom flask, and 100 mL of xylene was poured thereinto. The resulting system was heated for 6 hours with a mantle heater under reflux. Then the residue that had not dissolved was filtered off using a 100-mesh metallic mesh and was dried in a vacuum dryer at 80° C. under reduced pressure for 8 hours or more. The weight of the dried product obtained, W2b, was measured. The weight percentage of the weight W2b to the sample weight W1b, [(W2b/W1b)×100] (% by weight), was taken as the content of a fraction insoluble in hot xylene in the expanded beads.

(Peak Temperature of Inherent Peak, Peak Temperature of High Temperature Peak, Heat of High Temperature Peak, and Total Heat of Melting)

An expanded bead was cut into almost equal two portions, which were used as a specimen. According to the procedure described above with reference to FIG. 1, the heat of the high temperature peak, (B), and the total heat of melting, [(A)+(B)], were determined from the DSC curve obtained when heating about 2.5 mg of the specimen from 23° C. to 200° C. at a heating rate of 10° C./min by a heat flux differential scanning calorimetry, and the ratio of the heat of melting of the high temperature peak to the total heat of melting, (B)/[(A)+(B)], was calculated. The melting peak temperature of the inherent peak was taken as the peak temperature of the inherent peak, and the melting peak temperature of the high temperature peak was taken as the high temperature peak.

(Average of Cell Diameter (Average Cell Diameter) and Coefficient of Variation of the Cell Diameter of Expanded Beads)

Fifty expanded beads were arbitrarily selected from a group of the expanded beads. The expanded beads were each divided into almost equal two portions by a plane passing through the center of the expanded bead, and a photograph of the cross section thereof was taken using a scanning electron microscope. In the photograph of the cross section obtained, the area of the cross section of each of all cells that appeared in the cross section (the area of the opening in the cross section) of the expanded bead was determined using an image analysis software "NS2K-pro" manufactured by Nanosystem Corporation, and the diameter of a virtual true circle having the same area as the cross section of the cell was taken as the cell diameter of the cell. This operation was carried out for fifty expanded beads, and the arithmetic mean of the cell diameter of the cell was taken as the average of the cell diameter (average cell diameter) of the expanded beads.

The coefficient of variation of the cell diameter was determined by dividing the standard deviation of the cell diameter of cells in the expanded beads by the average cell diameter of cells in the expanded beads. The standard deviation was given by the square root of the unbiased variance.

(Average Aspect Ratio and Average Circularity of Expanded Beads)

The average aspect ratio and the average circularity of the expanded beads were determined using a bead size distribution analyzer "Militrac JPA" manufactured by Nikkiso Co., Ltd. Specifically, about 5000 expanded beads were freely fallen from the sample feeder of the analyzer, and a projection image was taken with a CCD camera. Then, arithmetic processing and join processing were conducted in sequence on the image information taken, to thereby obtain the average aspect ratio and the average circularity.

(10%, 50%, 90% Volume Average Bead Diameter and d90/d10 of Expanded Beads)

The 10%, 50%, 90% volume average bead diameters (d10, d50, d90) of the expanded beads were determined according to the bead size analyzing method thorough centrifugal sedimentation, and d90/d10 was calculated therefrom.

<Evaluations>

The variation in the compressive property of expanded beads was evaluated on expanded beads according to Examples and Comparative Examples, thereby evaluating the variation in the physical properties of the expanded beads. The results are shown in Tables 1 and 2.

(Variation in Physical Properties)

The variation in the physical properties was evaluated in terms of the coefficient of variation of the compressive stress under a 3 mm-strain. The compressive stress was determined in an environment at a temperature of 23° C. and a relative humidity of 50% using AUTOGRAPH AGS-X (manufactured by Shimadzu Corporation) with a cylindrical measurement jig having an inner diameter of 40 mm and a height of 40 mm. Expanded beads in a bulk volume of 40 mL were packed into the jig. The expanded beads in the cylinder was compressed with a compression jig having a circular face for compression with a diameter of 39.4 mm at a compression rate of 10 mm/min, and the load under a 3 mm-strain was determined. The load determined was divided by the area of the jig to which the pressure was applied, to thereby obtain the compressive stress [kPa] of the specimen under a 3 mm-strain.

This operation was conducted on five different specimens (expanded beads). The arithmetic mean of the compressive stress under a 3 mm-strain was determined, and the standard deviation of the compressive stress under a 3 mm-strain was divided by the arithmetic mean of the expanded beads to obtain the coefficient of variation of the compressive stress. The level of the coefficient of variation was evaluated as the variation in physical properties. The standard deviation was given by the square root of the unbiased variance.

TABLE 1

| | | | Example 1 | Example 2 | Example 3 | Example 4 |
|---|---|---|---|---|---|---|
| TPO paericles | TPO | Type | TPO1 | TPO1 | TPO1 | TPO1 |
| Conditions for expansion | Mini pellet | L/D | 1.3 | 1.3 | 1.3 | 1.3 |
| | Amount of blowing agent added | parts by weight | 7 | 7 | 7 | 7 |
| | Kind of crosslinking agent | — | DCP | DCP | DCP | DCP |
| | Amount of crosslinking agent added | parts by weight | 0.8 | 0.6 | 0.5 | 0.8 |
| | Step (B) Temperature | °C. | 160 | 160 | 160 | 160 |
| | Time | min | 30 | 30 | 30 | 30 |
| | Expanding temperature | °C. | 111 | 112 | 113 | 113 |
| | Expanding pressure | MPa (G) | 4.0 | 4.0 | 4.0 | 4.0 |
| Expanded beads | Apparent density | kg/m$^3$ | 244 | 205 | 183 | 180 |
| | Content of fraction insoluble in hot xylene | wt % | 48.0 | 18.4 | 11.4 | 54.8 |
| | Peak temperature of inherent peak | °C. | 118.3 | 115.2 | 114.5 | 114.3 |
| | Peak temperature of high temperature peak | °C. | — | 118.7 | 119.7 | 119.4 |
| | Heat of high temperature peak (B) | J/g | — | 25.0 | 21.0 | 14.4 |
| | Total heat of melting [(A) + (B)] | J/g | 50.0 | 51.0 | 53.0 | 50.0 |
| | (B)/[(A) + (B)] | — | — | 0.49 | 0.40 | 0.29 |
| | Average cell diameter | μm | 34 | 45 | 60 | 61 |
| | Coefficient of variation of cell diameter | % | 23 | 22 | 23 | 23 |
| | Average aspect ratio | — | 1.068 | 1.061 | 1.076 | 1.059 |
| | Average circularity | — | 0.987 | 0.990 | 0.990 | 0.991 |
| | 10% volume average bead diameter (d10) | mm | 3.01 | 3.19 | 3.34 | 3.34 |
| | 50% volume average bead diameter (d50) | mm | 3.25 | 3.48 | 3.68 | 3.62 |
| | 90% volume average bead diameter (d90) | mm | 3.54 | 3.75 | 3.96 | 3.93 |
| | d90/d10 | — | 1.18 | 1.18 | 1.19 | 1.18 |
| | Variation in physical properties (Coefficient of variation of compressive stress under 3 mm-strain) | % | 3.3 | 3.1 | 2.8 | 2.6 |

| | | | Example 5 | Example 6 | Example 7 | Comparative Example 1 |
|---|---|---|---|---|---|---|
| TPO paericles | TPO | Type | TPO1 | TPO1 | TPO2 | TPO1 |
| Conditions for expansion | Mini pellet | L/D | 1.3 | 1.3 | 1.3 | 1.3 |
| | Amount of blowing agent added | parts by weight | 7 | 5 | 7 | 7 |
| | Kind of crosslinking agent | — | DCP | DCP | DCP | DCP |
| | Amount of crosslinking agent added | parts by weight | 0.5 | 0.4 | 0.5 | 0.8 |
| | Step (B) Temperature | °C. | 160 | 160 | 160 | 160 |
| | Time | min | 30 | 30 | 30 | 30 |
| | Expanding temperature | °C. | 114 | 115 | 114 | 160 |
| | Expanding pressure | MPa (G) | 4.0 | 3.0 | 4.0 | 4.0 |
| Expanded beads | Apparent density | kg/m$^3$ | 133 | 180 | 156 | 68 |
| | Content of fraction insoluble in hot xylene | wt % | 12.6 | 1.5 | 13.5 | 48.0 |
| | Peak temperature of inherent peak | °C. | 114.9 | 114.8 | 114.6 | 117.0 |
| | Peak temperature of high temperature peak | °C. | 120.7 | 121.0 | 119.5 | — |
| | Heat of high temperature peak (B) | J/g | 10.3 | 23.0 | 6.3 | N/A |
| | Total heat of melting [(A) + (B)] | J/g | 51.5 | 56.0 | 28.2 | 50.0 |
| | (B)/[(A) + (B)] | — | 0.20 | 0.41 | 0.22 | — |
| | Average cell diameter | μm | 56 | 62 | 60 | 89 |
| | Coefficient of variation of cell diameter | % | 25 | 23 | 23 | 37 |
| | Average aspect ratio | — | 1.064 | 1.066 | 1.061 | 1.173 |
| | Average circularity | — | 0.990 | 0.990 | 0.990 | 0.976 |
| | 10% volume average bead diameter (d10) | mm | 3.74 | 3.33 | 3.62 | 4.25 |

TABLE 1-continued

|   |   |   |   |   |   |   |
|---|---|---|---|---|---|---|
| 50% volume average bead diameter (d50) | mm | 4.07 | 3.72 | 3.91 | 5.14 |
| 90% volume average bead diameter (d90) | mm | 4.37 | 4.18 | 4.27 | 5.58 |
| d90/d10 | — | 1.17 | 1.26 | 1.18 | 1.31 |
| Variation in physical properties (Coefficient of variation of compressive stress under 3 mm-strain) | % | 1.0 | 2.3 | 2.9 | 4.1 |

TABLE 2

|   |   |   | Comparative Example 2 | Comparative Example 3 | Comparative Example 4 | Comparative Example 5 |
|---|---|---|---|---|---|---|
| TPO particles | TPO | Type | TPO1 | TPO1 | TPO1 | TPO1 |
|  | Mini pellet | L/D | 1.3 | 1.3 | 1.3 | 1.3 |
| Conditions for expansion | Amount of blowing agent added | parts by weight | 4 | 2 | 3 | 3 |
|  | Kind of crosslinking agent | — | DCP | DCP | TRX117 | TRX117 |
|  | Amount of crosslinking agent added | parts by weight | 0.8 | 0.8 | 1.0 | 0.9 |
|  | Step (B) Temperature | ° C. | 160 | 160 | 160 | 160 |
|  | Time | min | 30 | 30 | 30 | 30 |
|  | Expanding temperature | ° C. | 160 | 160 | 160 | 160 |
|  | Expanding pressure | MPa (G) | 2.5 | 1.5 | 2.0 | 2.2 |
| Expanded beads | Apparent density | kg/m³ | 116 | 202 | 225 | 142 |
|  | Content of fraction insoluble in hot xylene | wt % | 52.0 | 52.0 | 61.0 | 52.0 |
|  | Peak temperature of inherent peak | ° C. | 117.0 | 117.0 | 117.0 | 117.0 |
|  | Peak temperature of high temperature peak | ° C. | — | — | — | — |
|  | Heat of high temperature peak (B) | J/g | N/A | N/A | N/A | N/A |
|  | Total heat of melting [(A) + (B)] | J/g | 50.0 | 50.0 | 50.0 | 50.0 |
|  | (B)/[(A) + (B)] | — | — | — | — | — |
|  | Average cell diameter | μm | 102 | 126 | 90 | 79 |
|  | Coefficient of variation of cell diameter | % | 36 | 31 | 37 | 30 |
|  | Average aspect ratio | — | 1.143 | 1.135 | 1.225 | 1.260 |
|  | Average circularity | — | 0.978 | 0.977 | 0.966 | 0.963 |
|  | 10% volume average bead diameter (d10) | mm | 3.84 | 3.16 | 3.164 | 3.66 |
|  | 50% volume average bead diameter (d50) | mm | 4.19 | 3.50 | 3.43 | 4.05 |
|  | 90% volume average bead diameter (d90) | mm | 4.61 | 3.86 | 4.43 | 3.95 |
|  | d90/d10 | — | 1.20 | 1.22 | 1.39 | 1.20 |
|  | Variation in physical properties (Coefficient of variation of compressive stress under 3 mm-strain) | % | 3.7 | 4.1 | 6.4 | 4.7 |

|   |   |   | Comparative Example 6 | Comparative Example 7 | Comparative Example 8 | Comparative Example 9 |
|---|---|---|---|---|---|---|
| TPO particles | TPO | Type | TPO1 | TPO1 | TPO1 | TPO1 |
|  | Mini pellet | L/D | 1.3 | 1.3 | 1.3 | 1.3 |
| Conditions for expansion | Amount of blowing agent added | parts by weight | 7 | 7 | 7 | 7 |
|  | Kind of crosslinking agent | — | TRX117 | TRX117 | DCP | DCP |
|  | Amount of crosslinking agent added | parts by weight | 0.9 | 0.9 | 1.0 | 1.2 |
|  | Step (B) Temperature | ° C. | 140 | 160 | 160 | 160 |
|  | Time | min | 30 | 30 | 30 | 30 |
|  | Expanding temperature | ° C. | 113 | 113 | 113 | 114 |
|  | Expanding pressure | MPa (G) | 4.0 | 4.0 | 4.0 | 4.0 |
| Expanded beads | Apparent density | kg/m³ | 160 | 152 | 160 | 195 |
|  | Content of fraction insoluble in hot xylene | wt % | 51.0 | 52.0 | 70.0 | 86.0 |
|  | Peak temperature of inherent peak | ° C. | 114.4 | 114.4 | 114.5 | 115.0 |

TABLE 2-continued

| | | | | | |
|---|---|---|---|---|---|
| Peak temperature of high temperature peak | ° C. | 120.2 | 119.8 | 119.7 | — |
| Heat of high temperature peak (B) | J/g | 17.9 | 18.4 | 16.8 | N/A |
| Total heat of melting [(A) + (B)] | J/g | 52.1 | 52.1 | 51.3 | 43.6 |
| (B)/[(A) + (B)] | — | 0.34 | 0.35 | 0.33 | — |
| Average cell diameter | μm | 48 | 42 | 52 | 51 |
| Coefficient of variation of cell diameter | % | 24 | 24 | 24 | 21 |
| Average aspect ratio | — | 1.199 | 1.197 | 1.138 | 1.130 |
| Average circularity | — | 0.973 | 0.971 | 0.979 | 0.979 |
| 10% volume average bead diameter (d10) | mm | 3.57 | 3.62 | 3.55 | 3.24 |
| 50% volume average bead diameter (d50) | mm | 3.84 | 3.93 | 3.87 | 3.57 |
| 90% volume average bead diameter (d90) | mm | 4.35 | 5.25 | 4.41 | 4.26 |
| d90/d10 | — | 1.22 | 1.44 | 1.24 | 1.32 |
| Variation in physical properties (Coefficient of variation of compressive stress under 3 mm-strain) | % | 5.5 | 5.3 | 5.1 | 4.4 |

[Evaluation Results]

As clear from Tables 1 and 2, the expanded beads according to Examples, which had an average aspect ratio of 1.10 or less and an average circularity of 0.985 or more and were thus in the form of a sphere close to a true sphere, were excellent in packability and provided a small variation in the physical properties.

On the other hand, as can be seen, the crosslinked expanded beads according to Comparative Examples, which had an average aspect ratio more than 1.10 and an average circularity less than 0.985, were not excellent in packability and provided a large variation in the physical properties.

The invention claimed is:

1. Thermoplastic olefin elastomer expanded beads, having an average aspect ratio of 1.10 or less and an average circularity of 0.985 or more.

2. The thermoplastic olefin elastomer expanded beads according to claim 1, comprising 1 to 60% by weight of a fraction insoluble in hot xylene.

3. The thermoplastic olefin elastomer expanded beads according to claim 1, having an apparent density of 30 to 300 kg/m$^3$ and a 50% volume average bead diameter of 1 to 10 mm.

4. The thermoplastic olefin elastomer expanded beads according to claim 1, having an average of a cell diameter of 20 to 100 μm and a coefficient of variation of the cell diameter of 30% or less.

5. The thermoplastic olefin elastomer expanded beads according to claim 1, having a crystal structure such that a melting peak inherent in the thermoplastic olefin elastomer (inherent peak) and one or more melting peaks on a higher temperature side than the inherent peak (high temperature peaks) appear on a DSC curve obtained when heating the expanded beads from 23° C. to 200° C. at a heating rate of 10° C./min.

6. The thermoplastic olefin elastomer expanded beads according to claim 5, wherein in the DSC curve, a total heat of melting is 20 to 60 J/g, and a ratio of a heat of melting of the high temperature peaks to the total heat of melting is 0.1 to 0.5.

* * * * *